United States Patent
Boelkens et al.

(10) Patent No.: US 6,892,100 B2
(45) Date of Patent: May 10, 2005

(54) OPEN DRIVE REGULATOR, AND A METHOD FOR OBTAINING SOFTWARE FOR AN OPEN DRIVE REGULATOR

(75) Inventors: Ulrich Boelkens, Nüremberg (DE); Gerhard Heinemann, Erlangen (DE); Georg Steinlein, Bayreuth (DE); Alexander Wagenpfeil, Roettenbach (DE)

(73) Assignee: Siemens Aktiengesellschaft (DE)

( * ) Notice: Subject to any disclaimer, the term of this patent is extended or adjusted under 35 U.S.C. 154(b) by 343 days.

(21) Appl. No.: 09/918,001

(22) Filed: Jul. 30, 2001

(65) Prior Publication Data

US 2002/0188357 A1 Dec. 12, 2002

(30) Foreign Application Priority Data

Jun. 7, 2001 (DE) .......................................... 101 27 803

(51) Int. Cl.⁷ .............................................. G05B 11/00
(52) U.S. Cl. ......................... 700/18; 717/100; 717/108; 717/114; 717/116
(58) Field of Search ................................ 700/18, 86, 1, 700/23, 108; 717/100, 108, 114, 116; 713/1

(56) References Cited

U.S. PATENT DOCUMENTS

| | | | |
|---|---|---|---|
| 4,742,467 A | | 5/1988 | Messerich et al. .......... 364/200 |
| 5,159,689 A | * | 10/1992 | Shiraishi ..................... 712/208 |
| 5,161,110 A | * | 11/1992 | Dorchak ..................... 700/108 |
| 6,026,336 A | | 2/2000 | Sakurai et al. ................ 700/86 |
| 6,169,927 B1 | * | 1/2001 | Schonthal et al. ............. 700/1 |
| 6,334,076 B1 | * | 12/2001 | Sakurai et al. ................ 700/86 |
| 6,345,382 B1 | * | 2/2002 | Hughes ...................... 717/100 |
| 6,490,719 B1 | * | 12/2002 | Thomas ...................... 717/107 |
| 2001/0056306 A1 | * | 12/2001 | Nakai et al. .................. 700/86 |

FOREIGN PATENT DOCUMENTS

| | | |
|---|---|---|
| DE | 69228968 | 1/2000 |
| EP | 1008929 | 12/1997 |
| WO | 9726587 | 7/1997 |
| WO | 9844396 | 10/1998 |

OTHER PUBLICATIONS

Funktionsbeschreibung, "Simodrive 611 Digital, Sinumerik 840D/810D," Bestell–Nr.: 6SN1197–OAA80–OAP6, Ausgabe 10.2000.

* cited by examiner

Primary Examiner—Anthony Knight
Assistant Examiner—Ronald D Hartman, Jr.
(74) Attorney, Agent, or Firm—Baker Botts L.L.P.

(57) ABSTRACT

The invention relates to an open drive regulator and a method for software generation which offers the capability for customer-specific selection of function objects which are compiled separately. The compiled function objects can be preprocessed in the form of a library routines. Based on the instantiated and compiled function objects, the software for the drive regulator is generated or is loaded online for an existing program sequence. It is particularly advantageous that the function objects can be changed by a customer, for example in order to implement a customer-specific functionality.

11 Claims, 3 Drawing Sheets

OPEN DRIVE REGULATOR, AND A METHOD FOR OBTAINING SOFTWARE FOR AN OPEN DRIVE REGULATOR

FIELD OF THE INVENTION

The invention relates to an open drive regulator and a method for software generation for an open drive regulator. The expression drive regulator means, for example, converter devices and their software for operation of electrical and/or hydraulic actuators (for example motors).

BACKGROUND OF THE INVENTION

What are referred to as intelligent drives for central and decentralized automation are known from the prior art. In this case, various components in a system carry out the tasks of open and closed-loop process control in a hierarchical structure. For example, a servo converter can signal the corresponding control data on a direct path to a control system. If there are a number of regulators in one station, they are connected to one another via a communication bus, which ensures direct data matching.

Intelligent drives are also used for specific open and closed-loop control tasks, for example for printing and winding technology. For this purpose, an intelligent drive provides functions which are matched to the requirements of the application by means of control software. The intelligent drive provides a library of different open and closed-loop control elements for these application-specific requirements. These are conventional modules from general control and automation technology, process regulators, technology regulators, monitoring/diagnosis algorithms, and start-up transmitters.

The SIMODRIVE drive regulator from Siemens AG is known in the prior art, particularly from the functional description "SIMODRIVE 611 digital, SIMUMERIK 840D/810D", Order No.: 6SN1197-OAA80-OAP6, issue October 2000. These regulators contain drive functions such as closed-loop control of the four-quadrant circuit including limits for synchronous and asynchronous motors with/without rotation, speed/position detection, rotation speed control, control messages/alarm reactions, and diagnosis functions.

The systems known from the prior art to this extent have the disadvantage that they are not what are referred to as open systems. Openness is a software function which is now in general use in the field of control engineering. It offers the user an efficient capability to integrate his own specific solutions in the overall system beyond the basic functionality that is preset in the factory. However, there are no such open software functions for the field of drives. In fact, software packets with functionalities that are defined and collated in the factory are offered in this field. Since these software systems are not open systems, the management, servicing and maintenance of customer-specific variants involve a large amount of management effort (software production, software handling, software marketing).

The object of the present invention is to provide an open drive regulator and an improved method for software generation for an open drive regulator.

SUMMARY OF THE INVENTION

The present invention allows software generation on the basis of function objects. These are compiled individually and can be preprocessed in the form of library routines. In a further step, the software for the open drive regulator is generated from the individually compiled function objects and from the library routines. This concept can be implemented generally on the central unit and on the intelligent peripheral components. Furthermore, jump-in points for customer-specific upgrades are offered in the function objects.

One particular advantage of the invention is that OEM customers are provided with the capability of including their own applications (functions or diagnoses) additively to the basic system. Links are provided for this purpose to the control infrastructure (for example parameter descriptions, messages, warnings, alarms, function call lists, file functions, documentation production, links to the control hardware).

A further particular advantage of the invention is that existing function elements of the basic system can be omitted and/or replaced by customer-specific function elements. The infrastructure of the omitted function elements is in this case not transferred to the generated software. This has the advantage of performance improvement, in particular with regard to the program running time and resource conservation, particularly with regard to the amount of memory required.

An additional particular advantage of the invention is the capability of loading function objects on line from any desired sources (internal memory media, external memory media (as examples: CD, Internet)) via the existing communication buses, and the capability of integrating them in the program sequence.

Furthermore, the present invention allows real-time applications to be provided, which are supported by a control capability, which can be tailor-made on a customer-specific basis, within a start-up tool.

The capabilities of an open drive allow fast, flexible solutions tailor-made for the customer, and also shorten the time-to-market for the basic system, since the development team no longer has to develop customer-specific solutions. "Special developments" on the basis of a validated basic structure are economic both for the user and for the manufacturer.

A further advantage of the present invention is that the capability of the customer to develop his own OEM software variants allows him to protect his know-how, and to keep it secret. For this purpose, an OEM customer can use appropriate development tools, procedures and documents provided by the manufacturer, so that he can carry out his own further development of the basic functionality. An advantageous feature in this case is the alignment of the basic software architecture into functional units with standardized interfaces, which can be combined with one another in a defined manner on the basis of a basic functionality. In addition to algorithms in different time slices, a function object and/or an instantiated function include:

parameters control messages, warnings, alarms initialization routines test scripts start-up options associated with the function.

The invention is not dependent on the chosen programming languages; however, a preferred software architecture is that provided by using a C++ environment.

DRAWINGS

A preferred exemplary embodiment of the present invention is described in more detail below and in conjunction with the drawings, in which.

DETAILED DESCRIPTION OF THE INVENTION

Figure 1:
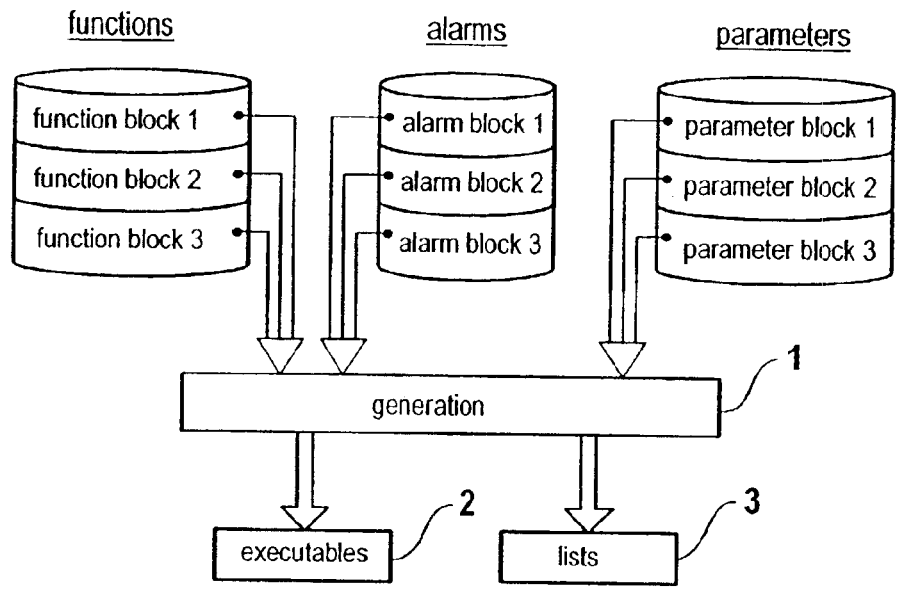
FIG. 1 shows a flowchart relating to the generation of a basic system.

The software architecture on which the sequence in FIG. 1 is based is broken down into the areas of the functions, alarms and parameters. In the example in FIG. 1, the functions area contains a function block 1, a function block 2 and a function block 3. These are respectively associated with corresponding alarm blocks 1, 2 and 3, and parameter blocks 1, 2 and 3. To generate executable basic system software, the corresponding function, alarm and parameter blocks are joined together in the module 1. The module 1 then generates a corresponding executable code 2 for the basic system and lists 3.

Figure 2:
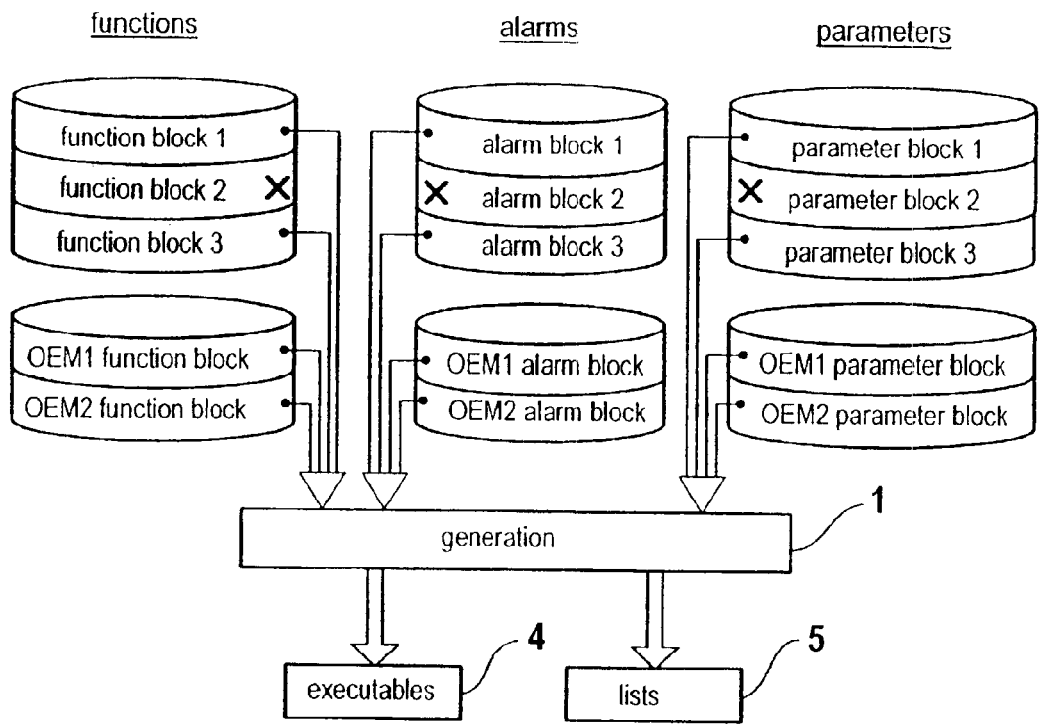
FIG. 2 shows a flowchart relating to the generation of a customer-specific software system.

FIG. 2 shows the generation of a customer-specific system based on the basic system in FIG. 1. In addition to the function, alarm and parameter blocks of the basic system, the system in FIG. 2 contains OEM1 and OEM2 function, alarm and parameter blocks in the corresponding areas of the software architecture. The function block 2, the alarm block 2 and the parameter block 2 of the basic system are deselected by means of a user input. The functions of the function block 1, function block 3, OEM1 function block and OEM2 function block are then joined together with the corresponding alarm and parameter blocks in the module 1.

The process of the module 1 joining the corresponding blocks together then results in customer-specific code 4 and corresponding lists 5. This has the advantage that, depending on the customer-specific requirements, the customer can replace specific parts of the basic system by function, alarm and parameter blocks produced by the customer.

Figure 3:
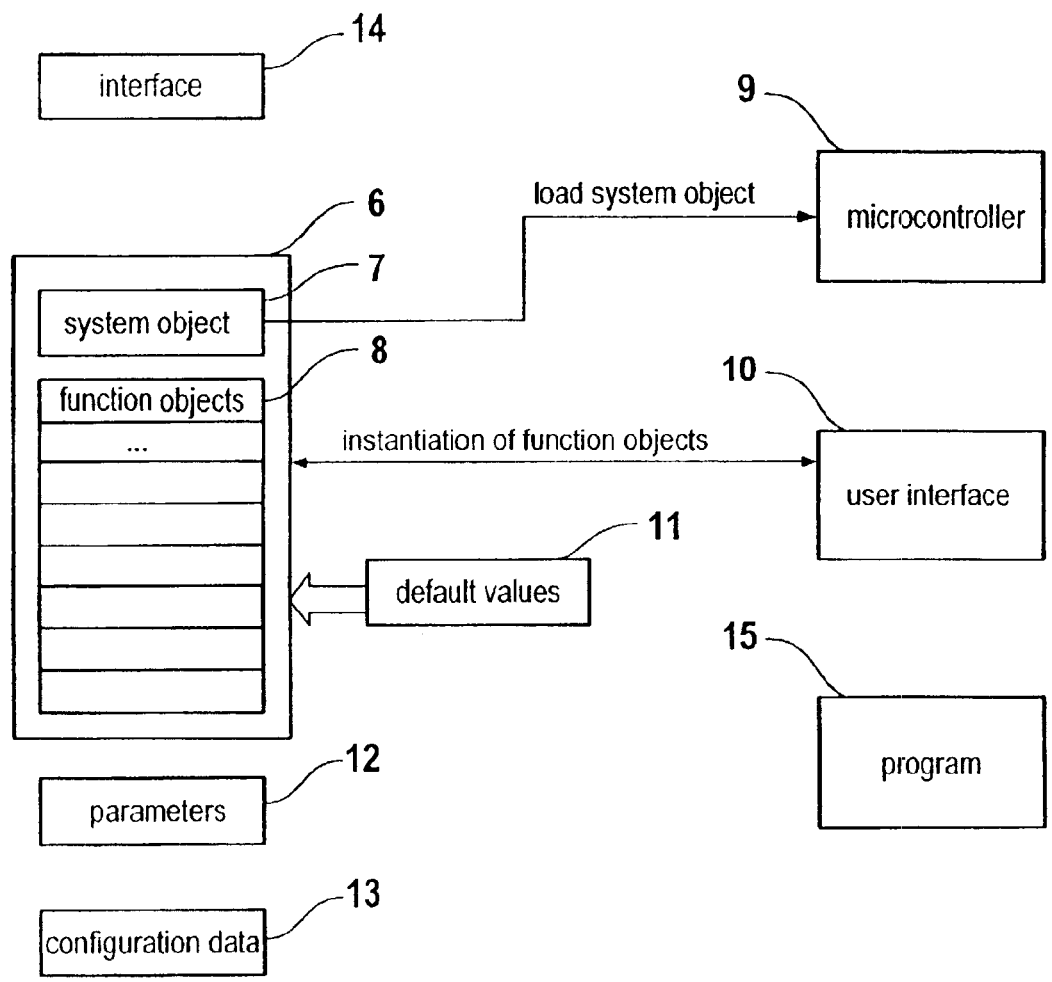
FIG. 3 shows a block diagram of an open drive regulator according to the invention.

FIG. 3 shows a block diagram of a corresponding drive regulator. The drive regulator has an object memory 6 for storing a system object 7 and function objects 8. The open drive regulator furthermore has a microcontroller 9, which is connected to the object memory 6, and also a user interface 10 for user-specific instantiation of one or more of the function objects 8. Furthermore, a memory 11 is provided for storing default values for the system object 7 and the function objects 8. The open drive regulator has a memory 12 for storing parameters, and a memory 13 for storing configuration data. For example, the open drive regulator can communicate via an interface 14 and a bus system, with a central unit or with other open drive regulators. Furthermore, it is also possible to introduce a smart card into the regulator via the interface 14 with user-specific data relating to the system configuration being stored on the smart card. The program for the open drive regulator is stored in the program memory 15.

When the open drive regulator shown in FIG. 3 is started, the system object 7 is first of all loaded into the microcontroller 9. In this case, the system object 7 carries out the function of an operating system. If there are no customer-specific data items, then the system object 7 instantiates the function objects 8 of the basic system using the default values in the memory 11 and joins them together to form an executable program, which is stored in the program memory 15 and the open drive regulator is started. Before and during the instantiation of the function objects, a user can enter user-specific data via the user interface 10, so that the instantiation of the corresponding function objects 8 can be carried out on a user-specific basis.

The user can likewise store user-specific function objects 8 in the object memory 6 corresponding to the OEM1 and the OEM2 function blocks in FIG. 2. Corresponding user-specific inputs are stored in the memory 12 as parameters, and in the memory 13 as configuration data. When the open drive regulator is started once again, these parameter values are then accessed in order to instantiate the function objects 8 on a corresponding user-specific basis.

Figure 4:
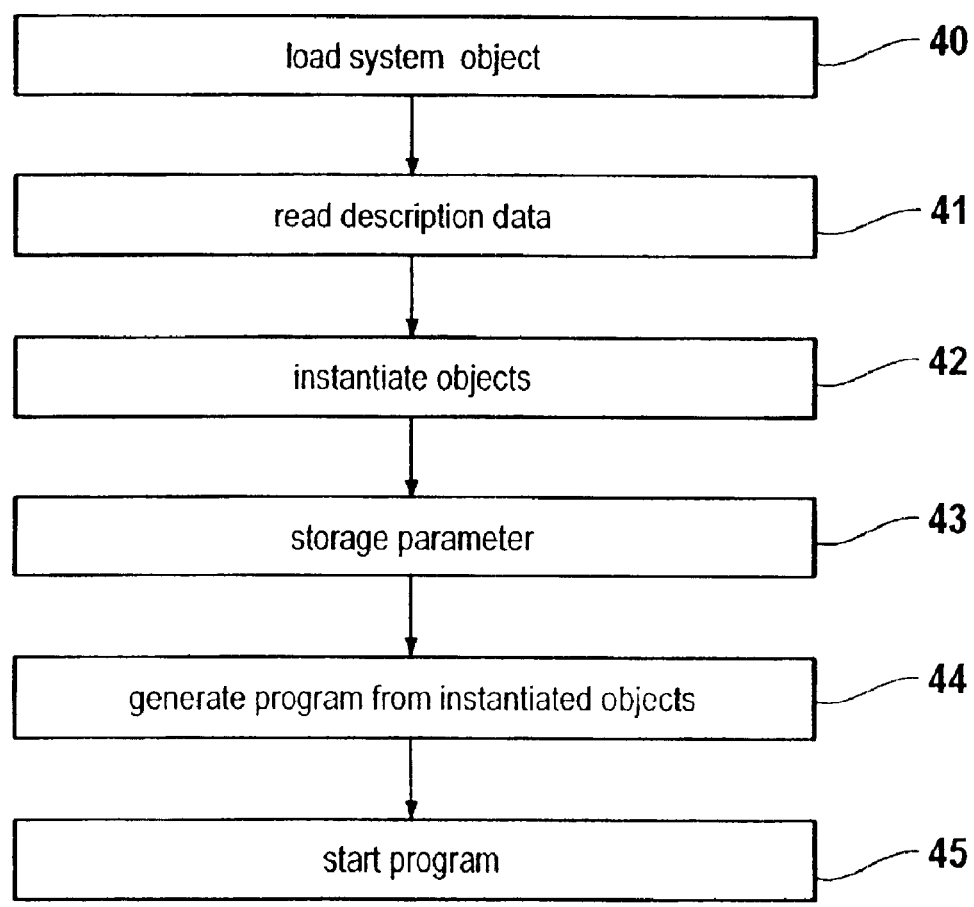
FIG. 4 shows a flowchart for the generation of the software for the open drive regulator shown in FIG. 3.

FIG. 4 shows an embodiment of the method according to the present invention. First, the system object is loaded into the microcontroller in the step 40. Description data relating to the configuration of the system are read in step 41, in order to instantiate the system object. If necessary, the function objects are instantiated by means of user-specific parameters in step 42. In step 43, the corresponding parameters are stored. In step 44, the instantiated objects are compiled separately, and an executable program is generated from the corresponding compiled products. This program is started in step 45.

We claim:

1. A method for generating software for an open drive regulator, comprising the steps of:
    providing a plurality of object oriented functions, wherein each object oriented function comprises a standardized software interface;
    providing customer-specific object oriented functions having a standardized software interface;
    selecting at least one object oriented function from the plurality of object oriented functions and customer-specific object oriented functions;
    instantiating each selected object oriented function with either a default values or customized values depending on a selection by a user;
    compiling code for each of the selected object oriented function separately;
    joining each of the selected object oriented function to generate the software for the open drive regulator from compiled object oriented functions.

2. The method according to claim 1, wherein each object oriented function comprises parameters, alarms messages, initialization routines, and test scripts.

3. The method according to claim 1, wherein each object oriented function comprises a jump-in point for customer-specific upgrades.

4. The method according to claim 1, wherein the customer specific object oriented function is provided through a communication bus by either an external or internal source.

5. The method according to claim 1, wherein the compiled object oriented functions are preprocessed and stored as library routines.

6. The method according to claim 1, wherein the software has a system configuration which is stored, and only a change relating to a relevant object oriented function can be carried out when an object oriented function is added or removed.

7. The method according to claim 1, wherein data required for software generation are made available via an interface for connection to a data bus or a smart card.

8. A system for generating user specific software on the basis of object oriented functions comprising:
- a library comprising a plurality of object oriented functions, wherein each object oriented function comprises a standardized software interface;
- a selection tool for selecting at least one object oriented function;
- at least one interface for providing user specific data and/or user specific object oriented functions;
- a compiler for compiling code for each of the selected object oriented function separately;
- means for joining each of the selected object oriented function to generate the software for an open drive regulator from the compiled object oriented functions;
- a microcontroller for generating the user specific software wherein the microcontroller is the microcontroller for running the user specific software; and
- a program memory for storing the program to be executed by the microcontroller.

9. The system according to claim 8, further comprising an object memory for storing the library.

10. The system according to claim 8, further comprising a parameter memory for storing system specific parameters.

11. The system according to claim 8, further comprising a configuration memory for storing configuration data.

* * * * *